United States Patent [19]
Dinkloh et al.

[11] 3,823,792
[45] July 16, 1974

[54] VEHICLE WITH STEPLESS DRIVE AND AUXILIARY BRAKING FORCE

[75] Inventors: Walter Dinkloh, Obernau; Wilhelm Spennemann, Aschaffenburg, both of Germany

[73] Assignee: Linde Aktiengesellschaft, Weisbaden, Germany

[22] Filed: Aug. 3, 1972

[21] Appl. No.: 277,679

[30] Foreign Application Priority Data
Aug. 6, 1971  Germany............................ 2139584

[52] U.S. Cl. .............. 180/82, 180/44 F, 180/66 R, 192/4 B
[51] Int. Cl.............................................. B60t 7/20
[58] Field of Search ........ 180/82, 66, 44 F; 192/4 B

[56] References Cited
UNITED STATES PATENTS
3,098,574  7/1963  Marco.............................. 180/66 R
3,186,170  6/1965  Gauthier........................... 180/66 R
3,451,560  6/1969  Witwer.............................. 180/66 R
3,706,351  12/1972  Neisch .............................. 180/82 R Primary Examiner—Robert B. Reeves
Assistant Examiner—Thomas E. Kocovsky
Attorney, Agent, or Firm—Karl F. Ross; Herbert Dubno

[57] ABSTRACT

A vehicle having a stepless drive, e.g., a hydrostatic transmission, between the engine and the vehicle wheels is provided with brake means in addition to the transmission for braking the vehicle or a trailer drawn thereby. The actuating device for the auxiliary braking force is connected to the hydrostatic transmission and is effective when the latter is in a braking condition to operate the auxiliary brake.

13 Claims, 5 Drawing Figures

VEHICLE WITH STEPLESS DRIVE AND AUXILIARY BRAKING FORCE

SPECIFICATION

1. FIELD OF THE INVENTION

The invention relates to vehicle-transmission systems, preferably provided with a stepless hydrostatic transmission between an engine and the vehicle wheels adapted to provide a braking force, and an auxiliary vehicle brake coupled with the transmission and effective when the latter is in a braking mode or condition.

2. BACKGROUND OF THE INVENTION

In an automotive vehicle having a stepless transmission between the engine and the vehicle wheels, it is common practice to provide a hydrostatic transmission consisting of a hydraulic pump coupled with the engine and one or more hydraulic motors coupled with the wheels in a fluid circuit with the pump. Such transmissions, especially when they use axial-piston pumps and axial-piston motors in a power-transferring circuit such that all of the fluid from the pump passes through the motors, can be used effectively for braking the vehicle when the pump is shifted into a position which the fluid is no longer positively displaced by the engine but is instead driven through the pump by a fluid output from the motor.

The typical axial-piston pump of the type described comprises a cylinder barrel which is swingable from a neutral position to one side or the other for forward and reverse drive of a fixed-position (nonadjustable) hydrostatic motor. Hydrostatic pumps and motors of this type are described in the U.S. Pat. No. 3,261,421 and commonly owned application Ser. No. 79,531, filed 9 Oct. 1970, now U.S. Pat. No. 3,687,212.

Frequently, it is desired to supplement the braking force of the hydrostatic transmission generated by positioning the pump such that the hydraulic fluid displaced by the motor is forced through the latter and eventually applied to the engine so that engine braking occurs, by an additional brake force. For this reason mechanical brakes of the internal-expansion or disc-brake type may be provided on the vehicle wheels.

In conventional automotive vehicles, auxiliary brakes of the latter type are powered by a hydraulic network or other conventional brake circuit (e.g. operating with compressed air) independently of the engine braking or transmission braking of the drive or transmission. It is also known to provide trailers towed by such vehicles with brakes which are actuated in tandem with the vehicle wheel brakes, generally with a slight lead or advance actuation to prevent a loaded trailer from driving the vehicle during downhill braking or braking from high speeds. In these cases, the brake-actuating circuit is provided with a braking-force regulator which balances the brake effect on the trailer brakes and the vehicle brakes to accomplish the desired time offset.

In all such systems, the requirement for two or more independent brake networks increases vehicle complexity and cannot readily be accommodated to the braking effect of the transmission or engine. In other words, the auxiliary or wheel brakes cannot readily be accommodated to hydrostatic-transmission braking to synchronize the two effects or render them appropriately complementary.

3. OBJECTS OF THE INVENTION

It is the principal object of the present invention, therefore, to provide an automotive vehicle with a stepless transmission, preferably a hydrostatic drive, wherein the aforementioned disadvantages can be obviated.

It is another object of the invention to provide a vehicle of the class described in which auxiliary braking force is applied to the main or towing vehicle and/or to a trailer towed thereby.

Still another object of the invention is to provide a vehicle having a hydrostatic transmission and capable of transmission or engine braking wherein the transmission or engine braking effect is coordinated with the braking effect of an auxiliary wheel brake.

Another object of the invention is to provide a vehicle of this type towing a trailer provided with auxiliary brakes in which the braking effect at the trailer is properly coordinated with the braking effect of the transmission or engine and/or with the braking effect at the vehicle wheels proper.

4. SUMMARY OF THE INVENTION

These objects and others which will become apparent hereinafter are attained, in accordance with the present invention, in a vehicle system comprising a main or towing vehicle and a trailer drawn thereby, at least one of the vehicles being provided with wheel brakes operated by a fluid under pressure from an actuating means. The towing vehicle advantageously is provided with an engine, and driven wheels connected to the engine by a stepless transmission of the hydrostatic type. The hydrostatic transmission can comprise a pump connected to the engine and adjustable, i.e., shiftable, between a forward and a reverse condition through an intermediate position corresponding to neutral in which no drive force is transmitted to the hydrostatic motor or motors connected to the driving wheels of the vehicle. According to the invention, means is provided between the hydrostatic circuit and the actuating means to coordinate the auxiliary braking force with the braking force applied by the transmission (engine braking) to prevent the trailer from driving the towing vehicle forwardly or dragging it rearwardly during brake operation.

According to a more specific feature of the invention, the actuating means for the wheel brakes of the vehicle is provided with a fluid-operated control device which is responsive to (i.e., displaceable by) the braking force of the hydrostatic transmission or is otherwise affected thereby. The actuating means of the invention can, however, be directly affected by the braking force, i.e., can be in direct force-receiving relationship with the fluid of the transmission circuit.

In a vehicle provided with a hydrostatic transmission of the typed described, the fluid pressure in the latter is dependent upon and a measure of the torque transmitted via the transmission to the engine from the vehicle wheels and hence is indicative of the braking force provided by the transmission. It is an important feature, therefore, that this fluid pressure is applied via a pressure responsive or pressure-measuring device to the actuating means of the auxiliary brake to operate the latter.

According to still another specific feature of the invention, the automotive vehicle comprises an engine and a set of driving wheels coupled with the engine by a hydrostatic transmission operating in closed circuit, i.e., having a hydrostatic pump driven by the engine and one or more hydrostatic motors connected to the pump and forming the closed circuit therewith, the motors being nonadjustable and having their output shafts connected to the driving wheels. The hydrostatic circuit comprises a pressure line or supply line extending from the output side of the pump to the input side of the motors and a return line extending from the output side of the motors to the input side of the pump. A pressure-responsive device according to the present invention may be connected in the return line and can operate upon a brake valve, the latter constituting the actuating means for the auxiliary braking force. It will be appreciated that the pressure in the return line, normally at a low level during vehicle operation without braking, experiences a surge during braking, the motors connected to the wheels serving as pumps while the pump serves as the load.

The pressure developed in this return lines is, of course, a function of the braking moment transmitted from the wheels to the transmission and engine.

It has been found to be advantageous to use the hydrostatic transmission for the braking of the vehicle without, however, transmitting the braking force to the engine itself. In this case, it is prefereed to swing the pump into its neutral position, thereby preventing the braking pressure of the fluid from driving the engine and causing the crankshaft of the latter to rotate at objectionably high speeds. In this latter case, a pressure relief valve may be provided to bypass the pump when the latter is in its neutral position to enable the motors to act as braking devices. When such relief valves are provided, the pressure in the return line, although nevertheless a measure of the braking force, may be reduced. In other words, while the presence of a pressure relief valve for brake operation when the pump is in a neutral position may vary the rate of flow through the return line, it is the pressure developed at the output side of the motor which is the relevant factor for braking force and, in the case of a non-adjustable hydrostatic motor, no concern need be shown for the use of a pressure relief valve under these conditions. However, when the hydrostatic motor is of the adjustable type, it is necessary to take into consideration the setting of the motor and the pressure responsive device may therefore be coupled to the motor for adjustment in accordance with the position thereof. The control device for the auxiliary braking force may, moreover, be provided with a switch adapted to operate a brake light, e.g., at the back of the trailer.

According to another specific feature of the present invention, the pressure responsive device is connected to the supply line of the hydrostatic transmission, i.e., the line connecting the output side of the pump with the input side of the motor. In this case, the pressure responsive device is effective only when the pressure in this line falls below a predetermined value to operate the auxiliary-brake actuating means. This embodiment of the invention is based upon the principle that, during brake operation, the supply line may experience a negative pressure, i.e., a pressure below a predetermined threshold as a result of the action of the hydrostatic motors as pumps and the draining by these motors of the supply line. In other words, when the motors act as brakes, the supply line is rendered pressureless and the auxiliary brake is operated in response to this condition.

The latter system, wherein the supply or return line of the hydrostatic transmission is connected to a pressure-sensitive device for operating the auxiliary brake when the supply-line pressure falls below a predetermined level, has the disadvantage that each time the supply line pressure falls to zero, the auxiliary brake is actuated so that it is not possible to allow the vehicle to idle or coast free from a driving force, the supply line pressure dropping to zero in a coasting and unbraked condition and causing operation of the auxiliary brake. Thus it is necessary to maintain some drive force behind the fluid in the pressure line if the brake is not to be actuated. It is also not possible in this type of hydraulic fluid network to provide an auxiliary braking force which is proportional to the braking force developed in the hydrostatic drive.

While the trailer drawn by the main vehicle may simply be provided with a brake of any conventional fluid-operated type to exert a drag on the main vehicle and prevent the forward inertia thereof from pushing the main vehicle forwardly, it is also possible to provide the trailer with a hydrostatic transmission for drive of its wheels. In this case, the auxiliary braking force is applied in addition to the hydrostatic braking force of this trailer transmission.

It will be understood that, in a hydrostatic transmission of the type described, the supply line and the fluid-return line alternate in function depending upon whether the vehicle is to be driven in the forward or in reverse direction. To this end, the present system provides a switchover or reversing valve adapted to connect the brake actuator and pressure-sensing means to the supply line or the return line in accordance with the modes of operation discussed above. The switchover valve can be connected to the control device for the hydrostatic transmission, e.g., to a pair of pedals respectively displaceable for forward and reverse operation, may be controlled automatically depending upon the pressure differential across the two lines, or may simply be a changeover valve arrangement in which the dominating pressure is employed.

Where the switchover valve is mechanically coupled to the control device for the hydrostatic transmission, it has been found to be advantageous to provide, upon the movable member of the switchover valve, a cam arrangement which enables the auxiliary brake to be applied only in the neutral position of the transmission, i.e., to prevent the braking force from driving the engine at prohibitive high speeds. The switchover valve may also be responsive to the direction of flow of fluid through one or both of the lines of the hydrostatic circuit, preferably the supply line. It is also a feature of the invention to provide means on the switchover valve or some other part of the transmission-control mechanism for mechanically operating the auxiliary brake as soon as the hydrostatic transmission is placed in its neutral position. A selective control element, e.g., a valve, may be provided in addition for preventing actuation of the auxiliary brake in the neutral position of the pump, i.e., the position in which the pump, even though driven, displaces no fluid through the hydraulic circuit.

5. DESCRIPTION OF THE DRAWING

The above and other objects, features and advantages of the present invention will become more readily apparent from the following description, reference being made to the accompanying drawing in which.

6. SPECIFIC DESCRIPTION

Figure 1:
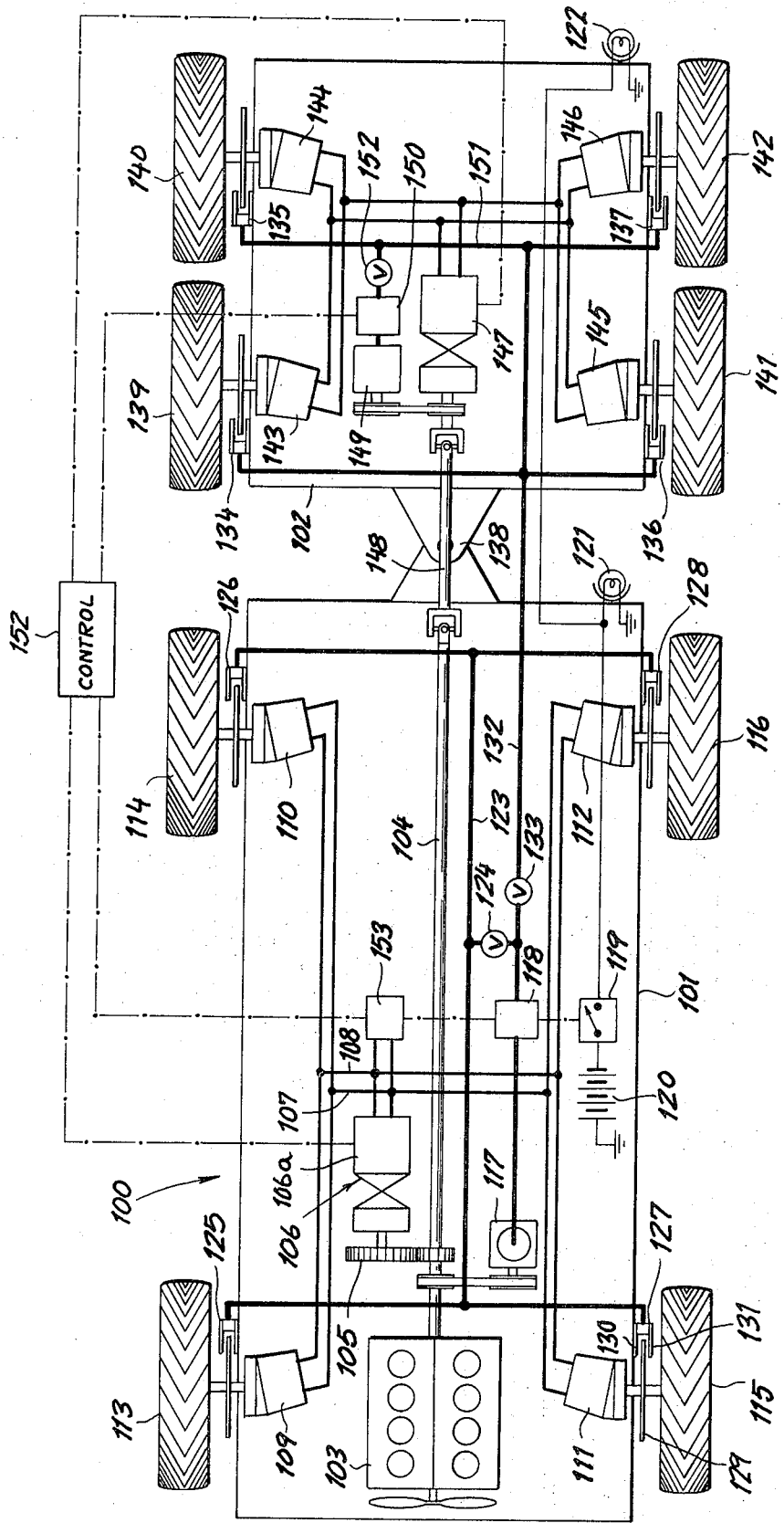
FIG. 1 is a diagrammatic plan view of the hydraulic systems of an automotive vehicle embodying the invention.

In FIG. 1, there is shown a vehicle 100 which comprises a main or towing vehicle chassis 101 and a trailer or a towed vehicle chassis 102. The main vehicle chassis 101 is shown to be provided with an internal combustion engine 103 whose output shaft 104 is coupled by a chain or gear transmission 105 to a variable-displacement hydrostatic pump 106 whose cylinder barrel 106a may be swung by a pedal arrangement or the like (FIGS. 2 and 3) to control the direction of displacement of fluid through the hydraulic networks and the volume-rate-of-flow of fluid therethrough. As described in the aforementioned patents, the pump 106 is connected to a supply network 107 and a return network 108 in series with the parallel-connected nonadjustable hydrostatic motors 109 – 112 to drive the vehicle wheels 113–116. Control systems enabling the wheels to be steered, etc., are conventional in the art and have not been illustrated. When the pump is swung to one side, fluid is displaced through the circuit in one direction for forward drive of the vehicle while a displacement of the pump in the other direction forces the hydraulic medium through the circuit in the opposite direction for reverse motion of the wheel.

The shaft 104 is connected to a source 117 of auxiliary braking fluid pressure, in this case a compressor, if the auxiliary fluid is air or a pump if the auxiliary fluid is a brake liquid. The auxiliary fluid is delivered to a brake-actuating valve 118 shown only diagrammatically and further illustrated in the subsequent Figures. This hydraulically controlled actuating device 118 may be provided with a stoplight switch 119 in series with the vehicle battery 120 and the brake lights 121 and 122 of the vehicle. When the valve 118 is operated upon the development of transmission-braking detection of a pressure change in the hydrostatic system, for example, brake fluid may be delivered to the network 123 via a cutoff valve 124 to operate the wheel brakes 125 – 128 of the vehicle. By way of example, each wheel brake is considered to comprise a disk 129 coupled to the wheel shaft and a pair of brakeshoes flanking the disk at 130, 131 and adapted to be urged against the disk when fluid is supplied. Of course, any other conventional wheel-braking system may be used, such as an internal-expansion or drum-type brake and the brake fluid may be air or a hydraulic medium. Furthermore, the auxiliary brakes may be operated by venting the network and permitting spring force or the like to apply the brake pads. The valve 124 may be closed to cutt off the auxiliary or wheel brakes of the towing vehicle or to enable them to be operated by a conventional master cylinder.

The valve 118 is also connected to a network 132 via a valve 133 to operate the wheel brakes 134 – 137 of the towed vehicle or trailer 102. Valve 133 may be closed when the wheel brakes of the trailer are to be operated by another control.

The trailer 102, which is connected to the towing vehicle 101 by a conventional hitch 138 will generally not have driving wheels so that the entire vehicle system is braked by the braking action of the transmission of the towing vehicle and the auxiliary or wheel brakes of the towed vehicle, the latter brakes preventing the inertia of the towed vehicle from being applied to the towing vehicle during stopping or slowing of the system.

The towed vehicle is provided with wheels 139 – 142, however, which may be connected to respective hydrostatic motors 143 – 146 driven by a pmp 147. The latter may be operated by a universal joint shaft system 148 connected to the motor shaft. The auxiliary source of brake fluid may derive from a pump 149 also connected to the universal shaft 148 and delivering fluid via a brake-control valve 150 to the hydraulic network 151 of the trailer wheel brakes. A further valve 152 may be closed when valve 118 is effective. The valve 150 may be operated by the transmission-actuating mechanism 152 as described above. The mechanism is also connected to the pressure sensor 153 of the auxiliary brake controls of the transmission as will be described in connection with FIGS. 2 – 5 below.

Figure 2:
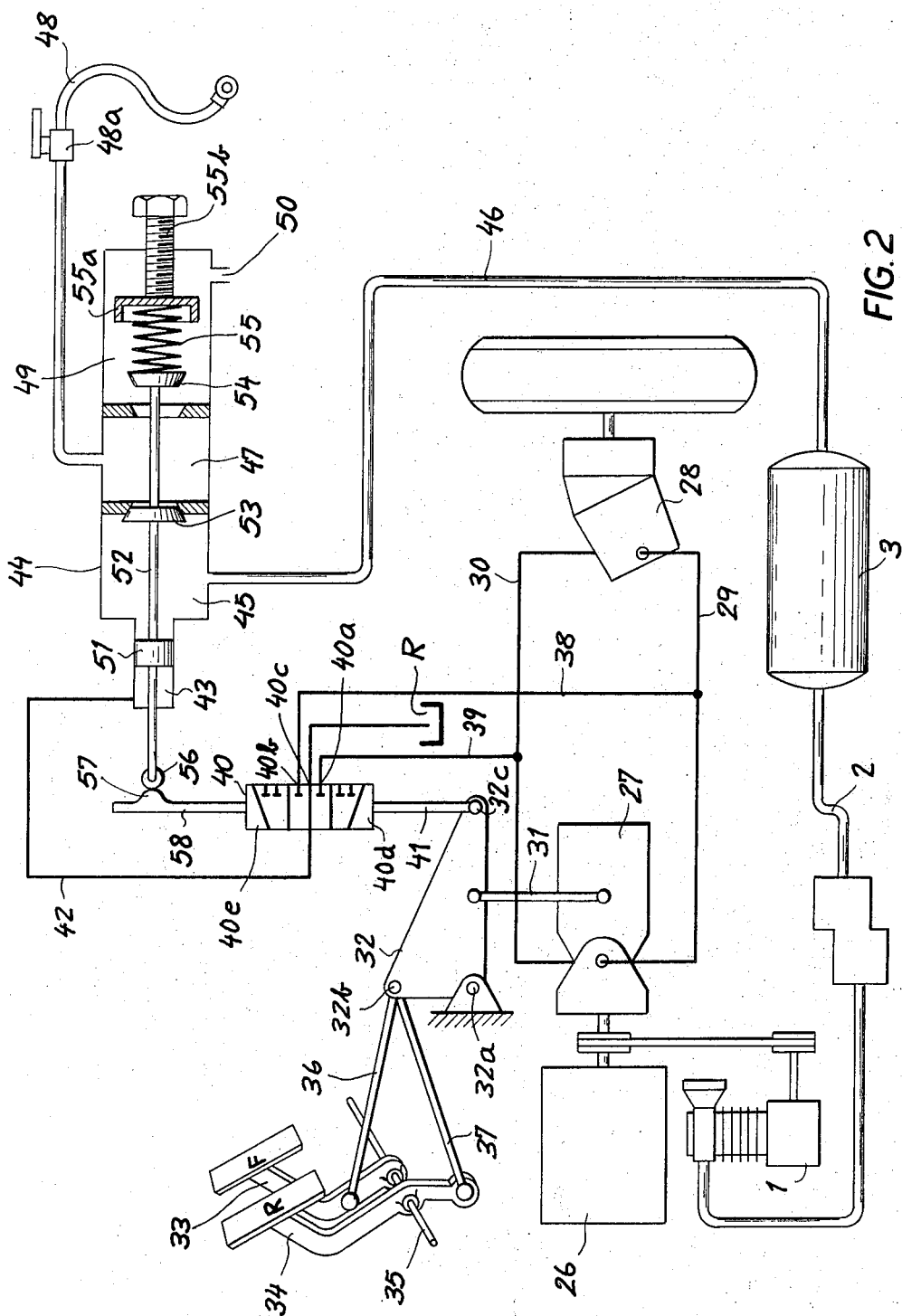
FIG. 2 is a brake circuit for a vehicle provided with a hydrostatic transmission, some of the parts being shown diagrammatically, others in section.

In FIG. 2, we have shown one practical realization of the system generally described in connection with FIG. 1. In this embodiment the internal-combustion engine 26 drives a hydrostatic pump 27 and a compressor 1 which is connected via line 2 to a compressed air storage tank 3. The pump 27 of the hydrostatic transmission is adjustable as described above and is connected via lines 29 and 30 with a hydrostatic motor 28 of the nonadjustable type, the motor being mechanically coupled to a vehicle wheel. As described in connection with FIG. 1, in general a plurality of such motors will be provided, all of them being connected in series with the pump 27 via the lines 29 and 30, and further connected in parallel or in series with one another.

The adjustable portion of pump 27 is connected by an articulated rod 31 with a bellcrank lver 32 fulcrumed at 32a to the chassis. The bellcrank lever 32 has a pivot 32b at one effective arm to a pair of links 36 and 37 and a pivot 32c at its other effective arm to a rod 41.

The hydrostatic transmission is actuated by a pair of pedal levers 33 and 34, fulcrumed on an axle 35, for forward and reverse displacement of the vehicle respectively. Link 36 connects the bellcrank lever 32 of the transmission-operating mechanism 31 – 37 with the lever 33 for counterclockwise displacement of the bellcrank lever upon depression of the "forward" pedal 33 while the link 37 is connected to the "reverse" pedal 34 so that depression of the latter swings the bellcrank lever 32 in the clockwise sense.

The rod 41 is connected to a switchover valve 40 whose function is to connect the auxiliary brake system and especially the pressure sensor thereof to either the supply line or the return line depending upon the mode of operation of the device as described earlier. The switchover valve is required because the two lines 29 and 30 are alternatively supply and return lines, depending upon whether the system is operated in the "forward" or the "reverse" directions. The switchover valve 40 is of the four-port, three-position type and has ports 40a and 40b respectively connected by lines 39 and 38 to the hydraulic lines 29 and 30. The further port 40c is connected to a reservoir R of the system. In the neutral position of the pump 27 shown in FIG. 2, i.e., a position in which both pedals are released, ports 40a and 40b are blocked and conduit 42 connects the pressure sensor 43 with the reservoir R. When the "forward" pedal 33 is brought into play, however, the valve section 40d communicates with the ports so that ports 40b and 40c are blocked while line 42 is connected to lines 39 and 30, the latter being one of the transmission conduits. When the "reverse" pedal 34 is operated, the valve section 40e is rendered effective, blocking ports 40a and 40c while communicating between line 40, line 38 and the transmission conduit 29.

Line 42 is connected to a pressure-sensor in the form of a hydraulic cylinder 43 forming part of the trailer brake valve generally represented at 44. The chamber or compartment 45 to the right of the piston 51 of the pressure sensor is connected by line 46 to the compressed air tank 3 while the central compartment 47 of this actuating means is connected by a line 48 and a cutoff valve 48a to the trailer brakes. The right-hand chamber or compartment 49 of valve 44 communicates with the atmosphere via a vent port 50 and receives a spring 55 which urges the valve members 53 and 54 to the left against the hydraulic pressure in cylinder 43, a stem 52 connecting the piston 51 to the valve members 53 and 54. The other seat for the spring 55 is a cup 55a which can be shifted to the left or to the right by an adjusting screw 55b to establish the spring loading and hence the force of the spring which must be overcome by the hydraulic fluid in cylinder 43 to displace the valve member 53 and 54.

The piston assembly 51, 52, 53 and 54 is also provided with a cam-follower roller 56 which is displaceable by a cam 57 carried by a rod 58 connected to the rod 41 of the changeover valve.

When the pedal 33 is displaced for movement of the vehicle in the forward direction, the bellcrank lever 32 is swung in a counterclockwise sense to raise the rod 41 and correspondingly draw the rod 31 upwardly and pivot the pump in the counterclockwise sense. The pump 27 drives hydraulic fluid through the line 29 (supply line) while line 39 constitutes the pressureless hydraulic-fluid return line. The vehicle motors 28 are thereby driven in the forward direction for normal operation at a rate depending upon the degree to which the pedal has been depressed and the pump has been offset from its neutral position.

When braking is required during forward movement of the vehicle, the motor 28 delivers fluid under pressure to the return line 30 which pressure is communicated by the switchover valve 40 to line 42 and thence to the pressure-sensing cylinder 43. When this pressure is sufficient to overcome the force of spring 55, the piston 51 is displaced to the right to close chamber 45 and open chamber 47 to the atmosphere, thereby relieving the brakes of the trailer which had previously been held in their disengaged position by the compressed air from the source 1 – 3. The force balance in the valve 44 between the spring 55 and the hydraulic pressure in cylinder 43 (the latter depending upon the degree of transmission braking) establishes the timing of the operation of the trailer brakes with respect to the transmission brake.

When the pump 27 is swung to its neutral position (FIG. 2), the cam 57 shifts the valve 53, 54 into the braking position so that release of the pedals automatically brings about actuation of the auxiliary or wheel brake.

Figure 3:
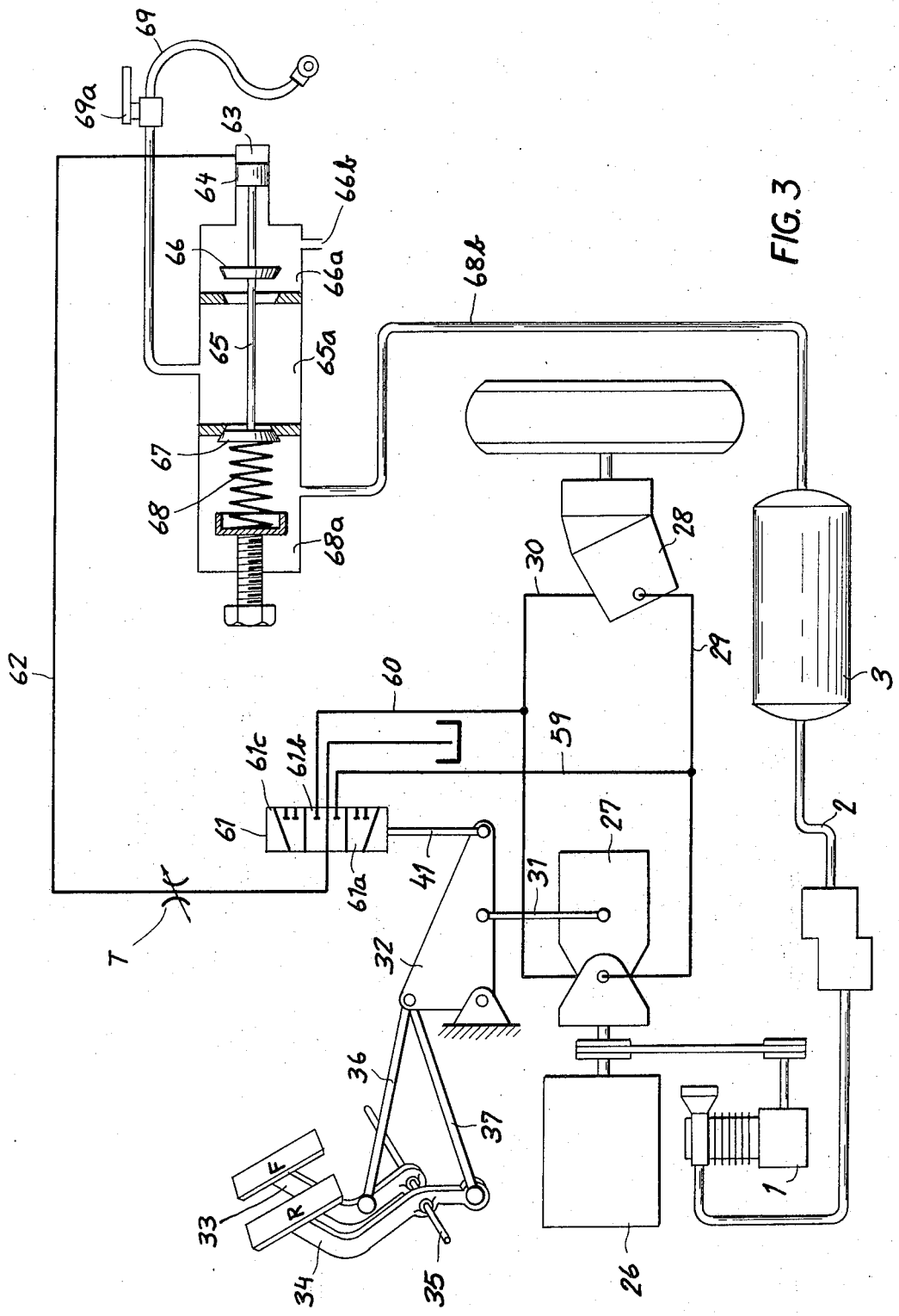
FIG. 3 is a view similar to FIG. 2 illustrating another embodiment of the invention.

Line 42 may be provided with a throttle such as has been illustrated at T in FIG. 3 to control the response of the vale system 44.

When the pedal 34 is operated, the reverse movement of the bellcrank lever 32 and the pump 27 takes place although the valve 40 again connects line 42 to the low-pressure or return line, in this case, line 29.

In the apparatus shown in FIG. 3 in which parts identical to those of FIG. 2 bear the same reference numerals, line 29 of the hydrostatic-transmission circuit is connected by a line 50 to a switchover valve 61 while a line 60 connects the switchover valve to the other line 30 of the transmission system. This valve opens in the manner described with respect to valve 40 and is connected, in turn, to the pressure-responsive cylinder 63 of the actuating device for the brake. Line 62 is provided with an adjustable throttle T which varies the response time of the actuating mechanism to the development of braking pressure in the hydraulic system as previously described. The actuating system of FIG. 3, moreover, comprises a piston upon which the fluid in chamber 63 acts and a connecting rod 65 tying the piston 64 to a pair of closure plates 66 and 67. A spring 68 with an adjustable precompression acts against the valve member 64 – 67. A chamber 66a of the valve opens into the atomsphere via a vent 66b while the intermediate chamber 65a communicates via line 69 with the wheel brakes of the trailer. A valve 69a in the latter line allows the brake system of the trailer to be cut off when the latter is detached. The left-hand chamber 68a of the actuating device communicates via line 68b with a compressed air source 1 – 3.

By contrast with the system of FIG. 2, the line 59 or 60 communicates between line 62 and the pressure-supply line of the transmission when the latter becomes pressureless to operate the wheel brake. For example, with the system in the neutral position as illustrated, cylinder 63 is discharged into the reservoir and spring 68 holds plate 67 closed to prevent pressure from being supplied to chamber 65a and the wheel brakes. Plate 66 is in an unblocking state to permit chamber 65a to communicate with the permanently vented chamber 66a.

During normal operation of the system, i.e., when the pedal 33 is depressed for forward driving, the pump 27 is swung in the counterclockwise sense and the lower section 61a of the valve 61 is rendered effective. Line 29 constitutes the pressure supply line of the transmission and delivers fluid to the motors 28 to drive the respective wheels while pressure builds up in line 62 and in cylinder 63 to shift the piston 64 to the left against the force of spring 68. This closes plate 66 to block communication between chamber 65a and the atmosphere while shifting plate 67 into an unblocking position. Fluid pressure from the compressed air tanks 3, applied to chamber 68a, is fed to chamber 65a and then to line 69 to unblock the trailer brakes. The vehicle then proceeds in the forward direction at a rate determined by the degree of displacement of the pedal 33.

If the vehicle begins to travel at a rate in excess of the driving rate, e.g. by passage onto a downhill stretch, the motors 28 function as pump to drain the pressure supply line 69 and render the latter pressureless. The reduction in pressure is transmitted via line 62 to the cylinder 63 which permits movement of the piston 64 to the right under the force of spring 68, thereby closing the valve plate 67 and valve chamber 65a to the atmosphere past plate 66. The pressure at the brakes is released so that these self-actuating units engage to brake the wheels of the trailer and prevent the inertia of the latter from driving the towing vehicle forwardly.

When both brake pedals are released, the valve 61 returns to its intermediate position in which section 61b is effective. Line 62 drains past the throttle T fluid from cylinder 63 to bring about a displacement of the closure plates 66 and 67 to the right under the force of spring 68 and vent chamber 65a to the atmosphere. This is the position illustrated in FIG. 3.

When the pedal 34 is depressed, the bellcrank lever 32 and the pump 27 are swung in the clockwise sense to render effective the upper section 61c of valve 61. At the same time, line 30 becomes the pressure line communicating between pump 27 and the hydraulic motors 28 of the hydrostatic transmission. The wheels are then driven in the opposite sense for reverse movement of the vehicle at a rate determined by the degree of displacement of the pump 27 and hence the extent of depression of the pedal 34.

When rearward braking occurs, line 30 becomes pressureless and line 62 drains through the valve 61 into line 60 to reduce the pressure in cylinder 63 and permit the valve 66, 67 to resume the position shown in FIG. 3, thereby actuating the brakes when the transmission is in a braking mode.

Figure 4:
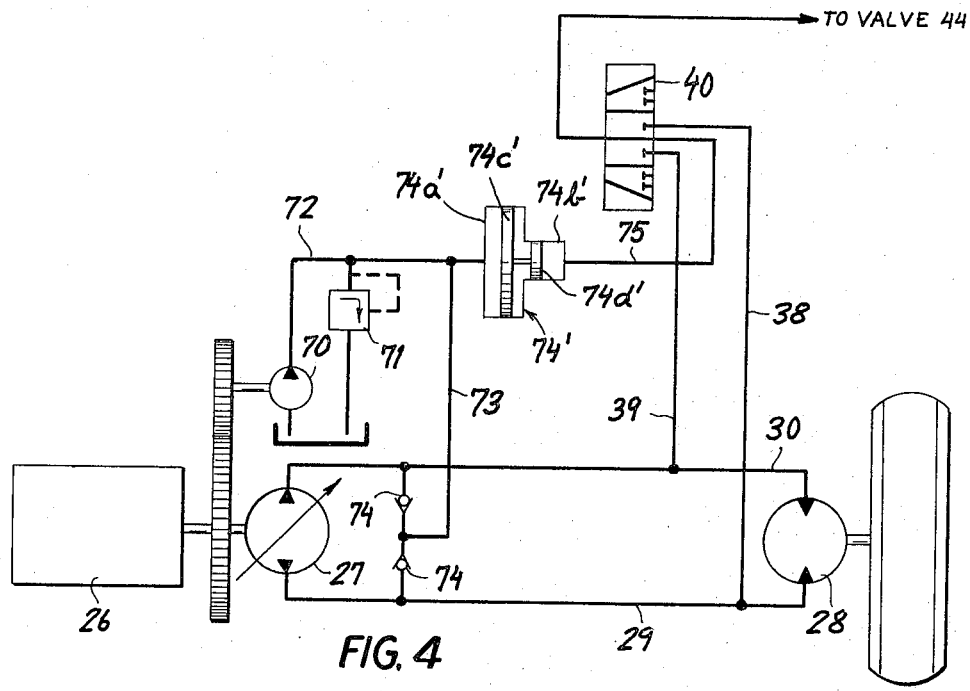
FIG. 4 is a view similar to FIG. 2 but showing a system wherein the auxiliary braking force is a source of hydraulic fluid.

The embodiment of FIG. 4 differs from that of FIG. 2 only in that an auxiliary source of fluid is provided to operate the brake-actuating valve 44. To this end, an auxiliary pump 70 is connected to the engine 26 by a gear transmission and has an input side connected to a reservoir and an output line 72 feeding a pressure amplifier 74'. A pressure-relieving valve 77 connects line 72 to the reservoir so that pump 70 is constantly effective to apply an elevated pressure to the amplifier 74'. The latter comprises cylinders 74a' and 74b' of relatively large and relatively small cross-sections, respectively, and a pair of pistons 74c' and 74d coupled together for joint movement. Thus if the pressure in cylinder 74a' is represented as P, the piston 74c' has an effective area A and the piston 74d' has an effective area A', the pressure P' will be P × A/A' where the ratio A/A' is the multiplication ratio and P' is the pressure in cylinder 74b'.

The output of the pressure amplifier is delivered via line 75 to the valve 70.

A line 73 is connected between a pair of checkvalves 74 to the line 29 and 30 of the hydrostatic transmission. The mechanical actuator for the valve 44 can, in this case, be eliminated since, in the neutral position of the pump 27 where both lines 29 and 30 have insufficient pressure levels to operate the valve 44, the pressure in line 72 suffices via the pressure amplifier, to supply fluid via line 75 to the cylinder 43, thereby rendering the brakes of the trailer effective. When transmission braking occurs during use, the system operates as described for the circuit of FIG. 2.

Figure 5:
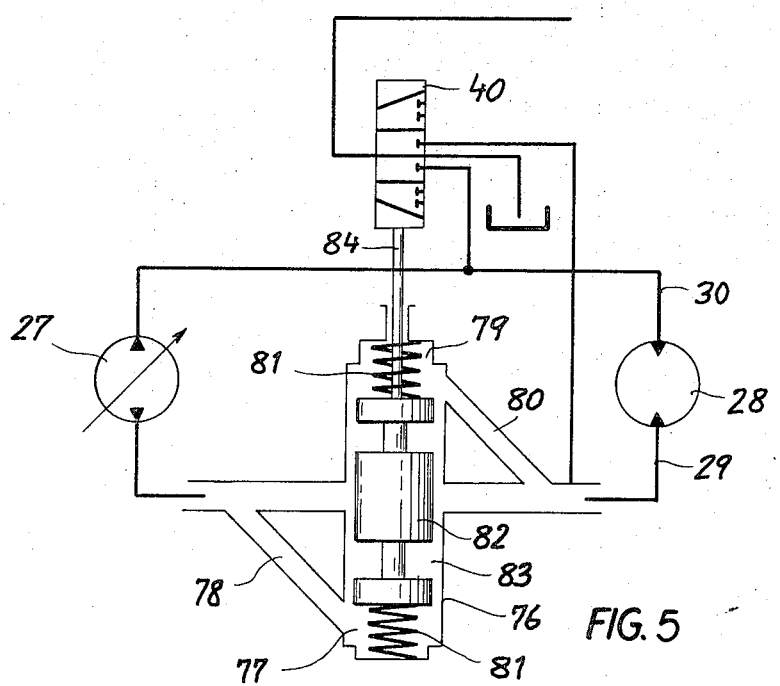
FIG. 5 is a detail view of a switchover valve actuator responsive to the direction of fluid flow in the hydrostatic drive.

In FIG. 5, we shown an arrangement wherein the valve 14 need not be coupled to the bellcrank lever 32 and is automatically responsive to the direction of fluid through the transmission circuit. The valve 76 of this system comprises a housing formed with chambers 77 and 79 at opposite ends thereof, the chambers communicating with ducts 78 and 80 connected to the hydraulic line 29 at locations spaced from the valve housing 76. A spool 82 is provided within the housing and is coupled by a rod 84 with switchover valve 70. A pair of centering spring 81 in the chamber 77 and 79 normally bias the valve 40 and the spool 82 into central positions.

When the pump 27 drives fluid through the circuit so that line 29 carries the fluid from the pump to the motor, the pressure in line 78 increases while the pressure in line 80 is somewhat lower since the spool constricts the outlet from vlave 76. The spool 82 is thereby shifted upwardly to correspondengly displace the valve 40. When, however, the fluid flows in the reverse direction, i.e., to the pump 27 via line 29, the pressure in line 80 exceeds the pressure in line 78 and the spool 82 is shifted downwardly to entrain the valve 40 in this direction.

To provide the desired response of the brake system to forward and reverse travel and for different braking situations, throttles can be disposed in the system as required and the spring forces may be adjusted accordingly.

When the system is employed with a trailer of the type described, it is desirable to maintain the compressed-air supply in a pressurized state for starting and even during long intervals of standstill. This is, of course, not possible where the compressed-air line is vented continuously. We, therefore, may provide a manually operated, driver-controlled and/or automatic valve (the latter being effective when the engine is turned on) to enable the compressed-air tank 3 to be charged.

It will thus be seen that we have disclosed an actuating mechanism for an auxiliary brake which can be utilized in any vehicular system whose wheel base includes several sets of traction wheels, as shown in FIG. 1, or a single set of such wheels (as in the more usual case) alternately powered and retarded in a braking mode of operation of a stepless transmission.

We claim:

1. A vehicle system comprising at least one vehicle having a plurality of traction wheels;
   respective hydraulic motors operatively connected with said wheels for driving same;
   an engine-driven pump for displacing a hydraulic fluid;
   a hydraulic supply conduit connecting said pump with said motors and a return conduit connecting said motors with said pump, said pump being of the variable displacement type;
   control means for regulating the displacement of said pump to vary the transmission ratio between pump-driving engine and said wheels, said pump and said motors forming a transmission operable in a vehicle driving and in a vehicle-retarding mode;
   at least one fluid operated friction wheel brake;
   a pressure sensor connected to one of said ducts and responsive to the operation of said transmission in a braking mode for applying fluid pressure to said friction brake in accordance with the degree of vehicle retardation by said transmission; and
   means for operating said friction brake independently of said sensor.

2. The system defined in claim 1 wherein said sensor is responsive to a pressure drop in said supply duct below a predetermined level.

3. The system defined in claim 1 wherein said sensor is connected to said return duct and is responsive to an increase in pressure therein above a predetermined level to operate said friction brake.

4. A vehicle system comprising a towing vehicle having an engine; a wheel means provided with a traction-wheel drive;
a stepless transmission on said towing vehicle connecting said engine with said drive for powering and retarding same in a driving mode and a braking mode of operation, respectively; a towed vehicle provided with an auxiliary vehicle brake operable to supplement the retarding action of said transmission upon said wheel means;
driver-operated control means on said towing vehicle for said transmission;
actuating means operatively coupled with said transmission for operating said auxiliary brake upon operation of said transmission in said braking mode, said transmission comprising at least one variable-displacement hydraulic pump connected to said engine, a hydraulic motor connected to said drive-wheel arrangement and conduit means connecting said pump and said motor in a closed fluid circuit, said control means being operatively connected to said pump for varying the displacement thereof, said actuating means including a pressure-responsive device connected to said conduit means and effective upon a change in pressure therein signifying said braking mode, said conduit means including a supply line connecting the output of said pump with the input of said motor and a return line connecting the input of said pump with the output of said motor, said device comprising a fluid-operated cylinder connected to one of said lines, said pump being constructed and arranged to reverse the flow direction through said lines and interchange the functions thereof; and a switchover valve connected between said cylinder and functionally identifal lines regardinless of the direction of displacement of said fluid through said lines as determined by said control means.

5. The system defined in claim 4 wherein said cylinder is connected to said supply line and said actuating means is responsive to a pressure drop in said supply line below a predetermined level.

6. The system defined in claim 4 wherein said cylinder is connected to said return line and said actuating means is responsive to an increase in pressure in said return line above a predetermined level to operate said auxiliary brake.

7. The system defined in claim 4 wherein said one of said lines is said return line and said actuating means constructed and arranged to apply a braking force to said auxiliary brake in a predetermined relationship with the pressure in said return line.

8. The system defined in claim 4, further comprising a linkage mechanically connecting said switchover valve with said control means.

9. The system defined in claim 4, further comprising means in said conduit means and connected to said switchover valve for automatically operating same in accordance with the direction of displacement of fluid through said conduit means.

10. The system defined in claim 4, further comprising means connected to said control means for mechanically operating said actuating means in a neutral position of said pump.

11. The system defined in claim 4, further comprising a source of ancillary fluid pressure connectable to said actuating means by said switchover valve for operating said cylinder.

12. The system defined in claim 4 wherein said actuating means comprisies a valve housing defining a first compartment communicating with the atmosphere, a second compartment adjacent said first compartment and communicating with said brake, a third compartment communicating with said second compartment, and a valve member connected to said cylinder and displaceable in response thereto, said valve member being provided with a pair of heads respectively blocking communication between said first and second compartments and between said second and third compartments in alternate positions while permitting such communication in other position; said switchover valve having a valve body provided with three positions including a first working position connecting said cylinder with one of said lines, an intermediate position, and a second working position connecting said cylinder with the other of said lines, said cylinder being connected with neither of said lines in said intermediate position.

13. The system defined in claim 12 wherein said control means includes two driver-controlled levers respectively displaceable for forward and reverse operation, and a bellcrank lever connecting said driver-controlled levers with said pump for displacement thereof in opposite directions, further comprising a compressed-air source connected with said third compartment.

* * * * *